Figure 1:
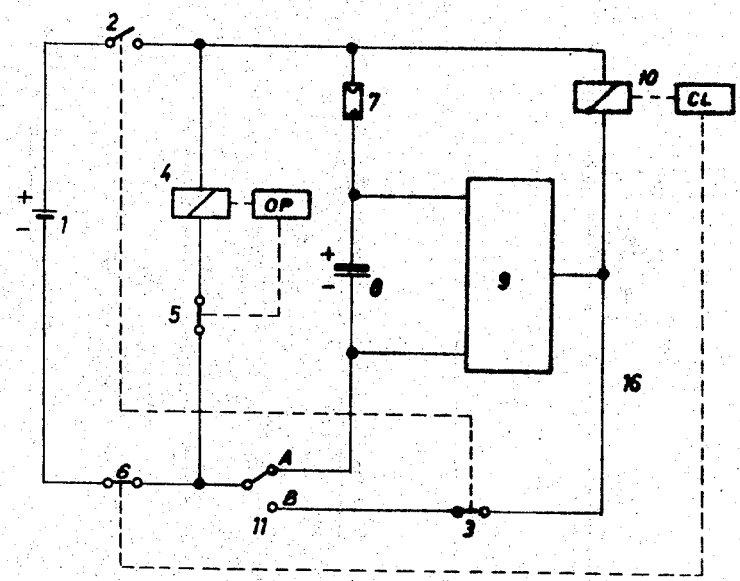

United States Patent

[11] 3,557,677

| [72] | Inventor | Joachim Schubert<br>Olching, Germany |
|---|---|---|
| [21] | Appl. No. | 731,010 |
| [22] | Filed | May 22, 1968 |
| [45] | Patented | Jan. 26, 1971 |
| [73] | Assignee | Ernst & Wilhelm Bertram Fabrik<br>Fototechn. Messgerate<br>Munche-Pasing, Planegger St., Germany |
| [32] | Priority | June 29, 1967 |
| [33] | | Germany |
| [31] | | B 93246 |

[54] EXPOSURE CONTROL CIRCUIT FOR A PHOTOGRAPHIC SHUTTER
4 Claims, 2 Drawing Figs.

[52] U.S. Cl.................................................. 95/53,
 95/10; 317/123, 317/151
[51] Int. Cl...................................................... G03b 7/08,
 H01h 47/22
[50] Field of Search.......................................... 95/10C, 53;
 317/123, 151

[56] References Cited
UNITED STATES PATENTS
3,449,639   6/1969   Brown et al................... 317/151X
FOREIGN PATENTS
995,790   6/1965   Great Britain................ 95/53

*Primary Examiner*—John M. Horan
*Assistant Examiner*—Joseph F. Peters, Jr.
*Attorney*—Woodhams, Blanchard and Flynn ABSTRACT: An exposure control circuit for a photographic shutter, the opening and closing of which are each effected by means of at least a pair of electromagnets. Both electromagnets are provided with switch devices connected in series thereto which, when subject to a current sufficient for actuating same, limit this current according to a specified operating time.

PATENTED JAN 26 1971 3,557,677

INVENTOR.
JOACHIM SCHUBERT

BY
Woodhams, Blanchard & Flynn
ATTORNEYS

EXPOSURE CONTROL CIRCUIT FOR A PHOTOGRAPHIC SHUTTER

The invention relates to an exposure control circuit for a photographic shutter which is opened and closed by means of an electromagnet. In known circuits of this type the opening magnet is firstly switched in to actuate the shutter-release and then depending on whether an automatic control is selected for the shutter or a random control (position B); the closing magnet is actuated either by a delay circuit or subject to the releasing of the shutter-release.

With such circuits it is important to preserve their supply batteries much as possible. The invention provides a means whereby it is possible to use a minimum of current from the supply battery in order to actuate both the opening and closing magnets. In accordance with the invention both electromagnets are provided with switch means arranged in series which, when subject to a current for actuating the magnets, limit this current according to a specified operating time.

These switch means may be designed in various ways. On the one hand each magnet can be provided with a contact which is opened by the relevant shutter blades reaching their end position and then closed again when the shutter is reopened. On the other hand, a capacitor provided with means for self-discharge can be connected in series to each electromagnet. Its charging time is sufficient to ensure the safe passage of each magnet after which no further current is received. The capacitor is returned to its discharged condition again and again by the means provided for self-discharge, particularly a parallel resistance, in which case the load of the battery, produced particularly by the parallel resistance, is of hardly any importance, since a sufficiently great time constant can be selected for self-discharge.

An elaboration of the circuit in accordance with the invention may be provided whereby a premature interruption of the circuit during the automatic control is prevented by the early actuation of the shutter-release. To achieve this the connection is effected via a main switch which is closed by the actuation of the shutter-release and, despite the latter operation, remains in this position until the main switch is returned to its open position by the reopening of the shutter.

Two exemplary embodiments of the invention are shown in the FIGS.

Figure 2:
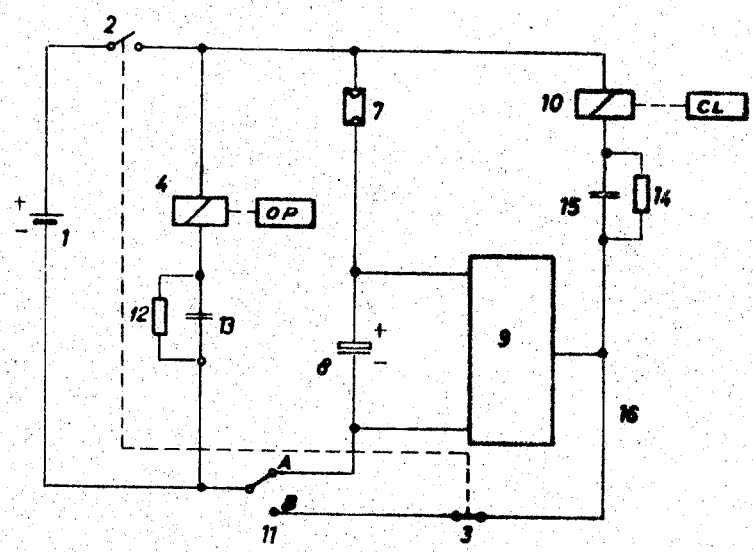

FIG. 1 shows a circuit having contacts as switch means for limiting the current, while FIG. 2 shows a circuit having capacitors as means for limiting the current.

The exemplary embodiment shown in FIG. 1 incorporates a battery 1 which feeds the circuit in accordance with the invention. The main switch 2 is connected to the shutter-release of the camera in such a manner that it is closed by the actuation of the latter and, despite this latter operation, remains in this position until the main switch 2 is returned to its open position by the reopening of the shutter. Therefore when the shutter-release is pressed, the switch 2 closes, thereby connecting the voltage of the battery 1 to the opening magnet 4 which receives current via the closed contacts 5 and 6, and releases the opening blades OP of the shutter. The contact 5 is connected to these blades in such a manner that the mechanism for opening the shutter opens the contact 5, thereby breaking the circuit for the opening magnet 4 so that the battery 1 is no longer discharged by this magnet. Moreover, contact 5 is connected to the shutter in such a manner that it is only closed again when the shutter is reopened, whereupon, as mentioned above, the contact 2 is simultaneously reopened. During these operations the already mentioned contact 6 remains uninfluenced in its closed position and its function will be described below in greater detail.

The part of the circuit of the invention containing the closing magnet 10 is simultaneously connected when the contact 2 is closed. For the purpose of actuating the magnet it is necessary to discern whether an automatic actuation of the shutter subject to the exposure or a random actuation (position B) is required. The choice between these two possibilities is made by adjusting the switch 11. The automatic exposure system is inserted in the switch position shown in FIG. 1 wherein the closing magnet 10 is connected, according to a timelag corresponding to the exposure, by means of a delay circuit controlled via the photoresistance 7. Owing to the switch 2 being closed the voltage of the battery 1 is connected to the photoresistance 7 via the capacitor 8 whereby the capacitor 8 is charged in accordance with the value of the photoresistance 7 which is subject to the exposure value. The charge voltage of the capacitor 8 is fed to the entrance of a basically known bistable circuit 9, for example, a transistorized Schmitt-Trigger circuit. When the capacitor has attained a certain charge voltage, the bistable circuit 9 changes and, in its new switch position, feeds the voltage of the battery 1 to the closing magnet 10. The magnet 10 actuates the closing blades CL of the shutter which, in their final position, open the above-mentioned contact 6, whereby the further flow of current via the closing magnet 10 is also interrupted and the battery is not required to provide any more current. Also the contact 6 is connected to the shutter in such a manner that it is not closed again until the shutter is reopened. Therefore, with this circuit both the opening and closing magnets can charge the battery during their actuation.

If the switch 11 is shifted into the unshown switch position, the is exposure system is disconnected and a random actuation of the opening and closing magnets is thereby made possible (position B). However, when the switch 11 is in this position for the required operation, another contact is necessary, namely the contact 3, which is connected to the shutter-release in such a manner that it opens with the pressing of the shutter-release before the closing of the main switch 2 and then closes again when actuated. As a result, by pressing the shutter-release and then closing the main switch, only the battery voltage can reach the opening magnet 4 first, since the pressing of the shutter-release causes the contact 3 to open simultaneously. Therefore, as described above, the opening magnet 4 is actuated when the switch 11 is in the unshown position, and in this way the contact 5 is also opened to disconnect the opening magnet 4 again. However, if the shutter-release is now actuated, in which case, as already mentioned, the main switch 2 remains closed, the contact 3 returns to its indicated closed switch position and, via the unshown switch position of switch 11 and the direct line 16, forms a direct circuit with the battery 1 whereupon the closing magnet 10 is then actuated. As described above, the contact 6 is opened again by the actuation of the closing blades so that in this case also it is only necessary to charge the battery 1 which corresponds practically to the time required for actuating the closing magnet 10.

In the exemplary embodiment according to FIG. 2 capacitors are used as means for limited the current supply from the battery 1. These are the capacitors 13 and 15. The mode of operating the contacts 2, 3 and 11 shown in FIG. 2 is the same as for those in FIG. 1. By pressing the shutter-release and then closing the main switch 2 the closing magnet 4 receives current via the capacitor 13 which is of such proportions that its charging time constant is sufficient to ensure the passage of the closing magnet 4. If the capacitor 13 is charged, it will not receive any more current. To discharge the capacitor 13 for a new exposure operation, there is provided the parallel resistance 12 which discharges the capacitor over and over again. The resistance 12 can obviously be replaced by corresponding means for self-discharge, particularly a corresponding dielectric of the capacitor. The discharging g of the battery 1 via the resistance 12 is of little consequence since, because of the time-lag produced before another photograph is taken, it is possible to select a sufficiently high ohmic resistance, i.e. the resistance 12.

As in the case of the circuit according to FIG. 1, the capacitor 8 is charged when the main switch 2 is closed, whereupon the bistable circuit 9 is shifted after the time-lag in question and the voltage of the battery 1 is fed via the capacitor 15 to the closing magnet 10. The operations involving the capacitor 15 and the parallel resistance 14 correspond entirely to those described with reference to the components 12 and 13.

Also in the circuit according to FIG. 2 there is provided a change-over switch 11 which connects the automatic exposure system in the indicated position, while random actuation of the shutter is made possible in the unshown position. Thus the contact 3 has the same function as described in FIG. 1. Also the circuit in FIG. 2 produces an effect whereby the battery is discharged only during the time required to actuate the opening magnet 4 and the closing magnet 10. Moreover, both previously described circuits ensure that a premature actuation of the shutter-release does not affect the initiation of the automatic exposure control, since in both circuits the main switch 2 is shifted into the closed position by pressing down the shutter-release and remains there until the shutter is opened again.

The embodiments of the invention in which an exclusive property or privilege is claimed are defined as follows:

I claim:

1. An exposure control circuit for a photographic camera shutter having a pair of shutter blade assemblies for opening and closing said shutter, a source of electrical current, a main switch connected in series with said source of electrical current and an electromagnet operatively associated with each of said shutter blade assemblies and responsive to said electrical current for sequentially opening and closing the respective one of said shutter blade assemblies, said exposure control circuit comprising:

first current controlling means connected in series with one of said electromagnets for controlling the flow of current from said source of electrical current to one of said electromagnets said first current controlling means being responsive to an energization of said one of said electromagnets to prevent a continued energization thereof;

second current controlling means connected in series with the other of said electromagnets for controlling the flow of current from said source of electrical current to said other of said electromagnets, said second current controlling means being responsive to an energization of said other of said electromagnets to prevent a continued energization thereof;

switching means connected in series with said other of said electromagnets and adapted to prevent the energization of said other of said electromagnets for a period of time after which time said switching means will permit the energization of said other of said electromagnets as a function of said second current controlling means;

whereby a closing of said main switch will energize said one of said electromagnets to operate said one of said shutter blade assemblies, said first current controlling means being responsive to an energization of said one of said electromagnets to prevent a continued energization thereof said switching means, after the expiration of said period of time, permitting an energization of said other of said electromagnets to energize said other of said electromagnets, said second current controlling means being responsive to the energization of said other of said electromagnets to prevent a continued energization thereof so that the total flow of electrical current from said source of electrical current is minimized.

2. An exposure control circuit according to claim 1, wherein said first current controlling means comprises a first switch connected in series with said one of said electromagnets, said first switch being closed when said one of said electromagnets is unenergized and opened when said one of said electromagnets is energized and said one of said shutter blade assemblies has been operated thereby;

wherein said second current controlling means comprises a second switch connected in series with said other of said electromagnets, said second switch being closed when said other of said electromagnets is unenergized and opened when said other of said electromagnets is energized and said other of said shutter blade assemblies has been operated thereby; and whereby a closing of said main switch will energize said one of said electromagnets to operate said one of said shutter blade assemblies, said first switch being opened by the operation of said one of said shutter blade assemblies to terminate the flow of electrical current to said one of said electromagnets, said switching means, after the expiration of said period of time, permitting an energization of said other of said electromagnets to operate said other of said shutter blade assemblies, said second switch being opened by the operation of said other of said shutter blade assemblies to terminate the flow of electrical current to said other of said electromagnets so that said total flow of electrical current from said source of electrical current is minimized.

3. An exposure control circuit according to claim 1, including a manually controlled switch connected in series with said other of said electromagnets when in a first position and series connected with said switching means when in a second position and third current controlling means connected between said manually controlled switch and said other of said electromagnets; said third current controlling means being responsive to an energization of said other of said electromagnets to prevent a continued energization thereof; said third current controlling means being closable after said period of time to permit an energization of said other of said electromagnets.

4. An exposure control circuit according to claim 1, wherein said first and second current controlling means each comprise a parallel connected capacitor and resistor; said resistor having a resistance value to permit a charging of said capacitor to a magnitude sufficient to prevent a continued flow of electrical current from said source of electrical current to the respective one of said electromagnets and permitting a discharging of said capacitor when said first and second current controlling means effects a termination of the flow of electrical current.